March 13, 1928.
F. G. FOLBERTH ET AL
WINDSHIELD CLEANER
Filed May 13, 1925
1,662,244
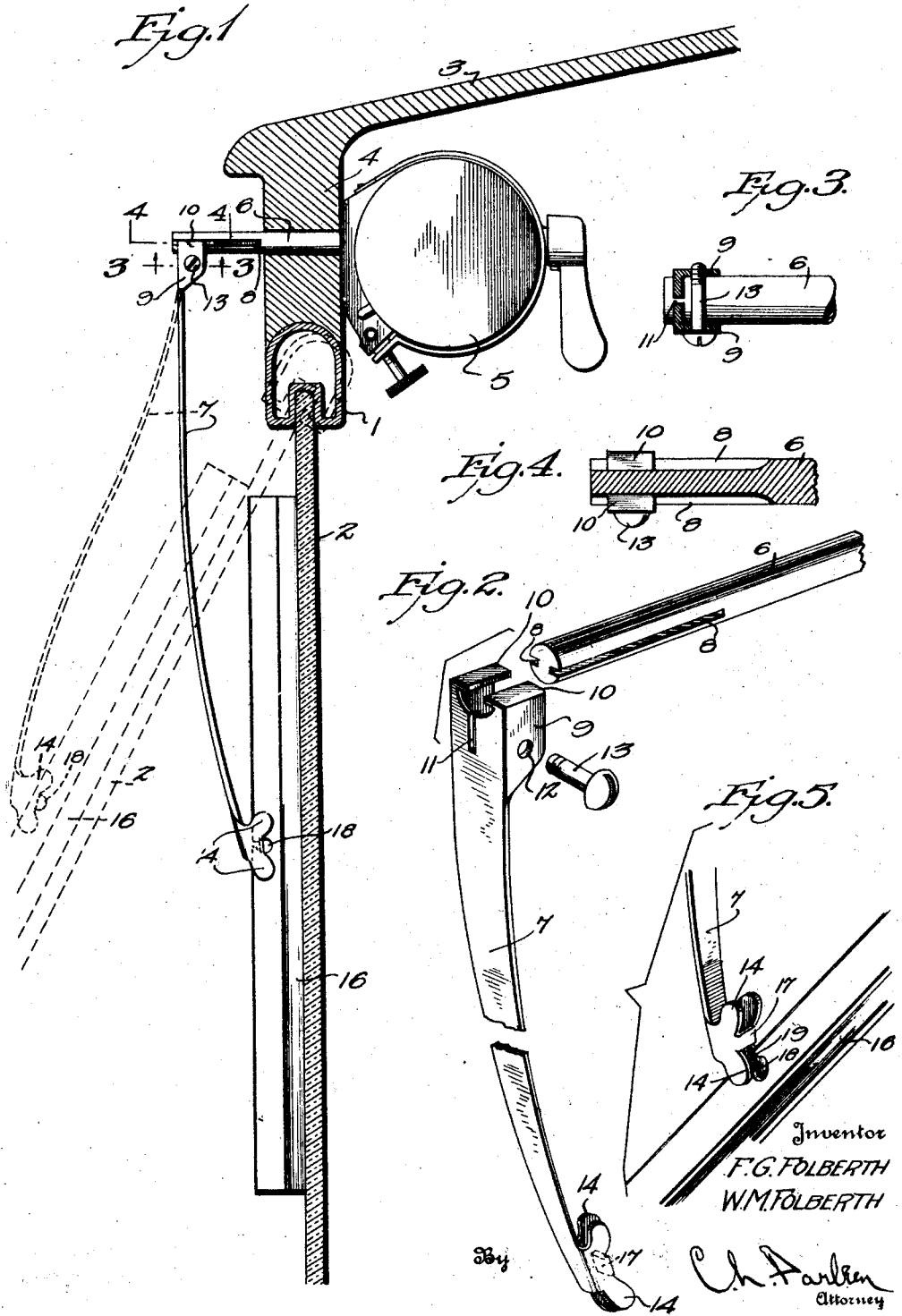

Patented Mar. 13, 1928.

1,662,244

UNITED STATES PATENT OFFICE.

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK, A CORPORATION OF NEW YORK.

WINDSHIELD CLEANER.

Application filed May 13, 1925. Serial No. 30,000.

This invention relates to windshield cleaners, and more particularly to means for connecting the cleaner element to its operating part.

In the present day windshield cleaner construction the wiper is usually attached to its carrying arm by means of a screw passing through the wiper element for securing the same between spaced flanges carried by the arm. Such an assembly not only requires the use of a tool but also provides a construction in which, because of rust and wear, it is not always expedient or practical to substitute a new wiper between said arm flanges by reason of the breakage or disruption caused in demounting the original or worn wiper element.

It is therefore an object of the present invention to provide a toolless mounting in which the wiper element may readily be replaced without the use of tools and without in any way tearing or injuring the wiper arm.

It is a further object of this invention to provide an improved wiper element of such form and construction as to be readily connected to the wiper arm in a very expeditious and facile manner.

In the accompanying drawings, we have shown one embodiment of the invention. In this showing:

Figure 1 is a vertical sectional view through a portion of the windshield and a portion of the body of a motor vehicle showing the invention applied, Figure 2 is a perspective view of the cleaner shaft and cleaner arm detached, Figure 3 is a detail sectional view on line 3—3 of Figure 1.

Figure 4 is a similar view on line 4—4 of Figure 1, and,

Figure 5 is a perspective view of the lower end of the cleaner arm and a portion of the cleaner element showing the manner of inserting the cleaner element in the holder.

Referring to the drawings, the reference numeral 1 designates a windshield frame of the usual construction having a pane 2 of glass or other transparent material arranged therein. The windshield is arranged in a vehicle in the usual manner and is adapted to be opened for ventilation. As the construction and arrangement of the windshield forms no part of the present invention, the manner of mounting it in the body of the car is not shown. A portion of the top of the vehicle body is shown at 3, and between the top of the vehicle and the top of the windshield frame, there is provided a depending portion 4.

In installing the windshield cleaner, a motor 5 is arranged on the inner side of the depending member and secured thereto in any suitable manner. The depending member is provided with an opening through which a shaft 6 of the motor passes to the exterior. This shaft is adapted to be oscillated by the motor and carries a cleaner arm 7 which is rigidly secured to the shaft to oscillate therewith.

As shown, the cleaner arm consists of a strip of resilient sheet metal which tapers toward its lower end and which is slightly bowed, as shown in Figure 1 of the drawings to maintain the cleaner element against the outer face or surface of the windshield. Suitable means are provided for securing the cleaner arm to the shaft. As shown, the shaft is provided with two diametrically opposed horizontal slots 8 which extend longitudinally from the outer end of the shaft. The upper end of the cleaner arm is provided with an integral clamp. In forming the cleaner arm, it is cut from a blank of material and the upper end is of greater width than the remainder, permitting the formation of a web 9 on each side. These webs are provided with extensions 10 adapted to be arranged in a plane at right angles thereto and received in the slots 8. To permit the extensions to be moved inwardly to clamp the arm on the shaft, the body portion of the cleaner arm is provided with a cut out portion or slot 11. The webs are provided with a pair of alined openings 12, one of which is threaded and are adapted to receive a bolt 13 which clamps the arm to the shaft. As shown (see Figure 3), the bolt extends transversely beneath the shaft.

In the present invention, we also provide means for securing a cleaner element to the lower end of the cleaner arm without the use of bolts, screws, or other fastening elements. As shown, a holder is formed on the lower end of the cleaner arm, and this holder consists of a pair of webs or guides 14, slightly spaced from each other to receive the cleaner element. The cleaner or wiper element consists of a backing strip 15 and a flexible strip 16 of rubber or other suitable material, adapted to contact with the surface to be cleaned. One of the webs is provided with an extension 17 which is adapted to be arranged transversely, substantially bridging the space between the two webs. Adjacent the rear edge of the backing strip 15, we provide a circular opening 18, and this opening communicates with a slot 19 extending to the rear edge, said slot and opening forming what might be termed a key slot.

The operation of the device will be apparent from the foregoing description. The arm is secured to the cleaner shaft 6 by placing the guides or extensions 10 in the slots 8. The arm may be adjusted longitudinally of the shaft to cause the cleaner element to contact with the surface of the windshield with the desired tension. After the arm has been adjusted, the bolt 13 is inserted in the openings 12 and tightened to maintain it in adjusted position. By providing the slots 8 of appreciable length, the cleaner may be adjusted to various makes of automobiles in which the thickness of the depending part 4 may vary. The resilient cleaner arm maintains the cleaner element in contact with the surface of the windshield at all times and is still sufficiently flexible to permit the upper half of the windshield to be opened to the dotted line position shown in Figure 1 of the drawings for the purpose of ventilation. The cleaner arm and cleaner element will then assume the dotted line position shown.

In inserting a new cleaner element, the cleaner arm is sprung outwardly away from the windshield and the cleaner element is arranged at an angle to the arm, as shown in Figure 5 of the drawings, which will permit the transverse member 17 of the holder to pass through the slot 19 into the circular opening 18. When the transverse member is arranged in the circular opening, the cleaner element is free to swing about it as a pivot and assume its operative position in contact with the windshield. After the element has been installed, the transverse member 17 is arranged at right angles to the slot and is of sufficient width to prevent accidental displacement of the cleaner element.

It is to be understood that the form of our invention herewith shown and described is to be taken as a preferred example of the same, and that various changes in the shape, size, and arrangement of parts may be resorted to without departing from the spirit of the invention or the scope of the subjoined claims.

We claim:

1. In a device of the character described, a cleaner arm, a holder arranged on the lower end of said arm, said holder comprising a pair of spaced webs, a cleaner element adapted to be arranged in said holder between said webs, said cleaner element being provided with a circular opening adjacent its rear edge and a slot extending from said opening to said edge, and an extension formed on one of said webs and adapted to bridge the space between said webs, said extension being adapted to be manipulated through said slot into said opening and being normally interlocked therein against displacement.

2. In a device of the character described, a cleaner arm formed of a strip of resilient sheet metal, a holder formed on the lower end of said arm and comprising a pair of extensions adapted to be arranged at an angle to the body of the arm to form a pair of spaced webs, a cleaner element adapted to be arranged in said holder between said webs, said cleaner element being provided with a circular opening adjacent its rear edge and a slot extending from said opening to said edge, and an extension formed on one of said webs and having a dimension adapted normally to bridge the space between said webs, said extension having a narrower dimension adapted to be arranged opposite the slot for being passed through said slot into said opening to permit the disposition of the first dimensioned portion of the extension in the opening.

3. In a device of the character described, a cleaner arm, a holder arranged on the lower end of said arm, said holder comprising a pair of spaced webs, a cleaner element adapted to be arranged in said holder, said cleaner element being provided with an opening adjacent its rear edge and a slot extending from said opening to said edge, and an extension formed on one of said webs and adapted to bridge the space between said webs, said extension being of greater width than thickness whereby said cleaner element may be mounted in said holder by arranging said cleaner element at an angle to said arm to permit said extension to pass through said slot into said opening, and said cleaner element may then be turned to a position substantially parallel to said cleaner arm and retained in position in said holder.

4. A windshield cleaner comprising an operating shaft, an arm fixed thereto and having on its free end a lateral extension having a larger cross sectional dimension in one direction than a direction at right angles thereto, and a cleaner element having an opening with an entrance slot through which the smaller cross sectional dimension of said extension may pass to dispose said extension within the opening of said cleaner element, the larger cross sectional dimension of said extension being greater than the width of said entrance slot and normally disposed to bridge the entrance slot whereby said cleaner element is secured against displacement from said arm while permitting pivotal movement of the arm in a plane perpendicular to the glass of an associated windshield.

5. A windshield wiper element for being readily connected to an operating arm having a part the cross section of which has a major axis and a minor axis, said element comprising a flexible wiping strip and a rigid backing strip, the latter having a part formed with a recess having a relatively narrowed entrance.

6. A windshield wiper element for ready connection to an operating arm having a part with a cross section of a major axis and a minor axis, said element comprising a flexible wiping strip and a rigid backing strip, said backing strip having a part formed with a key slot, the reduced portion of the slot constituting the entrance and being of a width less than the major axis of said arm part and greater than the minor axis of said arm part whereby the wiper may be connected to the arm without the use of tools.

In testimony whereof, we affix our signatures.

FREDERICK G. FOLBERTH.
WILLIAM M. FOLBERTH.